(12) United States Patent
Cesternino et al.

(10) Patent No.: US 6,269,695 B1
(45) Date of Patent: Aug. 7, 2001

(54) ANALOG LIQUID LEVEL SENSOR

(75) Inventors: Kimberly Cesternino, Kentwood; Peter H. Strom, Big Rapids, both of MI (US)

(73) Assignee: Nartron Corporation, Reed City, MI (US)

( * ) Notice: Subject to any disclaimer, the term of this patent is extended or adjusted under 35 U.S.C. 154(b) by 0 days.

(21) Appl. No.: 09/035,712

(22) Filed: Mar. 5, 1998

(51) Int. Cl.⁷ .......................... G01F 23/36; G01F 23/52; G01F 23/60; G01F 23/56; H01C 10/14
(52) U.S. Cl. ................... 73/313; 73/290 R; 73/305; 73/319; 338/33
(58) Field of Search ........................ 73/313, 319, 322.5 R, 73/304 R, 305; 338/33

(56) References Cited

U.S. PATENT DOCUMENTS

| | | | |
|---|---|---|---|
| 4,567,762 | * | 2/1986 | Hoppert et al. ............... 73/304 R |
| 4,827,769 | * | 5/1989 | Riley et al. ..................... 73/313 |
| 4,920,798 | * | 5/1990 | Weaver ........................... 73/313 |
| 5,122,302 | * | 6/1992 | Hormadaly ..................... 252/518 |
| 5,138,881 | * | 8/1992 | Riley et al. ................... 73/304 R |
| 5,267,475 | * | 12/1993 | Gaston ........................... 73/319 |

* cited by examiner

Primary Examiner—Hezron Williams
Assistant Examiner—Dennis Loo

(74) Attorney, Agent, or Firm—Brooks & Kushman P.C.

(57) ABSTRACT

Two embodiments of an analog liquid level sensor are provided for measuring the level of a liquid in a container having a volume/depth relationship wherein each sensor has a resistance-to-float-displacement profile matched to the volume/depth relationship of the container. Each sensor includes a dielectric coated metal bar which acts as a heat sink and a ground plane. A pair of electrically spaced terminals and a printed circuit including a thick film resistor pattern and a metallization pattern having metallized graduations are formed on the metal bar for reduced electrical noise characteristics and improved hysteresis. The resistance of the resistor pattern is electrically coupled between the terminals and has a resistance which varies at different positions between the terminals. The metallization pattern is formed on the resistor pattern which, in turn, is formed on opposite sides of the dielectric coated metal bar. A float assembly including a buoyant housing and a contact assembly is connected to the dielectric coated metal bar to reciprocate in a generally vertical direction in response to the level of the liquid in the container. The contact assembly is connected to the buoyant housing in a fixed vertical relationship thereto for making electrical connection with the metallization pattern and for changing the effective resistance of the resistor pattern between the terminals. The contact assembly includes a pair of spring-loaded wiper contacts for making electrical connection with the graduations of the metallization pattern on opposite sides of the metal bar. The terminals provide an electrical signal which is a function of the vertical position of the wiper contacts along the metal bar.

12 Claims, 4 Drawing Sheets

ANALOG LIQUID LEVEL SENSOR

TECHNICAL FIELD

This invention relates to liquid level sensors and, in particular, to analog liquid level sensors.

BACKGROUND ART

A large number of sensing approaches and transducer types have been developed for the determination of the level of liquids in open or closed vessels or containers. Not only is the knowledge of the level itself important, but other measurements can be inferred from the level. For example, if the container geometry and dimensions are additionally known, the volume of the liquid can be determined. If additionally, the density of the liquid is known, its mass can be calculated.

Relatively high technology methods to sense liquid level by measurement of properties such as distance, time, and pressure include: sonic and ultrasonic surface reflection, optical surface reflection, optical transmission, rotation of polarized light, capacitive property sensing, dielectric conduction between electrodes, inductive property sensing, mechanical resonance damping, float device containing a magnet affecting pulse reflection of a ferromagnetic strip, float containing an end of a linear variable differential transformer, pressure sensor at bottom of the tank, differential pressure sensor bubbling tube at bottom of the tank, long vertical float buoyancy force, long vertical negative buoyancy force, sight gauge with multiple optical level discrimination, multiple thermistors, tank sonic resonance spectra correlations, and the like. These methods typically have cost and complexity as their major detriment.

Liquid level is generally sensed by one of two methods: obtaining a discrete indication if a predetermined level has been reached (i.e. point sensing) or obtaining an analog representation of the level as it changes (i.e. continuous sensing). One commonly employed apparatus for continuously sensing the level of liquid, such as a fuel, in fuel storage tanks is the use of a float mechanism.

Relatively low technology methods currently being used to sense liquid levels by measurement of various properties use techniques such as: ohmic conduction between electrodes, variable force sensitive resistive conductors, float moving a plunger, and float on a mechanical pivot arm moving a wiper contact element across a wire wound or thick film resistor. The ohmic conduction method is prone to detrimental accuracy impairing contamination and electrolytic effects on the electrodes. Variable force sensitive resistors inherently suffer from poor accuracy and are seldom used. The float moving a plunger method is capable of good accuracy and precision but is cumbersome and requires some additional sensing method to convert position into a sensor signal. The method by which a float rotating a mechanical pivot arm to move an electrical wiper contact across a variable resistor type of liquid level sensor is of primary commercial interest because of its large number of existing and potential applications, relative simplicity, and low cost.

The following listed features pertaining to liquid level sensing via floats on pivot arm mechanisms, however, are less than desirable:

Requires a relatively large volume of space for pivot arm motion;

Often requires specific orientation to allow for pivot arm motion;

Cumbersome to install and remove;

Large size;

High weight;

High parts count;

Mechanism if often flimsy—heavier mechanism requires a larger float;

Mechanism has inherent modes of mechanical vibration—potential failures;

Mechanism is inherently poor in mechanical impact testing—potential failures;

Relatively large pivot arm movement is reduced to smaller motion of the wiper arm on the wire wound or film resistor—loss of resolution and accuracy;

Mechanical play, articulation, and tolerance of numerous components introduces hysteresis and adversely affects accuracy;

Wear of articulating mechanical components increases modes of failure;

Nonmetallic substrate of the wire wound or thick film resistor acts as a thermal insulator allowing heat build up in events of an incorrect electrical connection—a potential source of ignition for a dangerous incendiary incident;

Small size of the wire wound or thick film resistor promotes concentration of heat generation and higher temperatures in events of an incorrect electrical connection—an additional potential source of ignition for a dangerous incendiary event;

Location of the articulating electrical wiper contact with the wire wound or thick film resistor can be above liquid level such that mechanical play can potentially produce a source of sparking and/or heat production—a safety concern;

Nonmetallic substrate of the wire wound or thick film resistor offers no shielding from spurious magnetic fields that can cause signal noise;

Nonmetallic substrate of the wire wound or thick film resistor offers no shielding from spurious electric fields that can cause signal noise.

The above detrimental points and limitations present numerous opportunities for improvements.

U.S. Pat. No. 4,779,460 discloses a sensor and system for measuring the level of a liquid and which includes a linear potentiometer having a resistance circuit element and a mechanism for changing the resistance of the circuit element including a conductor formed from a semiconducting composition having a resistance inversely proportional to the horizontal force it experiences.

SUMMARY OF THE INVENTION

An object of the present invention is to provide an improved analog liquid level sensor including a printed circuit having a resistance which varies at different positions on the printed circuit wherein the sensor is provided for a container having a volume/depth relationship and wherein the sensor has a resistance-to-displacement profile matched to the container's volume/depth relationship.

Another object of the present invention is to provide an analog liquid level sensor for a container which is simple to assemble, install and thereafter remove from the container.

Still another object of the present invention is to provide an analog liquid level sensor including a support structure and a printed circuit having a resistance formed on the support structure wherein the support structure acts as a heat sink in order to dissipate any heat build up.

Yet still another object of the present invention is to provide an analog liquid level sensor including at least one metallization pattern having graduations formed on a printed circuit having a resistance for reduced electrical noise characteristics and improved hysteresis.

In carrying out the above objects and other objects of the present invention, in a system for measuring the level of a liquid in a container having a volume/depth relationship, an analog liquid level sensor is provided. The sensor includes a support structure adapted to be received and retained within the container, a pair of electrically spaced terminals, and a printed circuit formed on the support structure and electrically coupled between the terminals and having a resistance which varies at different positions on the printed circuit between the terminals. The sensor also includes a float assembly connected to the support structure to reciprocate in a generally vertical direction relative to the support structure in response to the level of the liquid in the container. The float assembly includes a hollow buoyant housing and a contact assembly supported within the buoyant housing in fixed vertical relationship thereto for making electrical connection with the printed circuit for changing the effective resistance of the printed circuit between the terminals. The terminals provide an electrical signal which is a function of the generally vertical position of the contact assembly along the support structure. The sensor has a resistance-to-float-displacement profile matched to the volume/depth relationship of the container.

Preferably, the support structure is a dielectric coated metal bar which acts like a heat sink.

Also, preferably, the printed circuit includes a resistor pattern and a metallization pattern having metallized graduations formed on opposite sides of the metal bar for reduced electrical noise characteristics and improved hysteresis.

Still further, preferably, the resistor pattern is a thick film resistor pattern and wherein the metal bar acts as a ground plane for the thick film resistor pattern.

Still, preferably, the resistor pattern includes a temperature compensating resistor.

Preferably, the contact assembly includes a pair of spring-loaded wiper contacts for making electrical connection with the graduations of the metallization pattern formed on opposite sides of the metal bar.

In one embodiment, the sensor further includes a mount coupled to the support structure and adapted to mount the support structure to a surface location on the container so that the support structure is allowed to hang within the container in a generally vertical orientation.

The analog liquid level sensor includes material and design enhancements, especially for fuel level applications, which result in numerous improvements in such aspects as: wiring fault condition safety resolution, precision, accuracy, mechanical durability, simple mounting requirements, volume, weight, design flexibility, ease of end use insertion and removal, part count, assembly, size, source impedance and transfer function, submerged articulating electrical contacts, electromagnetic compatibility, and reliability. An analog electrical signal provided by the sensor is intended to be sent to a dedicated electrical gauge or other means of data acquisition.

These improvements are generally realized by an engineered design approach that features integration and simplification of two major functional components resulting in a multiplicity of improvements over existing types of pivot arm liquid level sensors. The first feature is the sturdy dielectric coated steel substrate bar onto which has been deposited the various film resistor patterns and metallization patterns, also called the printed circuit (i.e. PC). The second feature is the float assembly including a buoyancy adjustment capability, close tolerance slide guides, and at least two integral spring loaded wiper contacts to make electrical connection with the metallization patterns of the PC. By moving up and down in a generally vertical manner on the PC, the float assembly level, as buoyed by the liquid, will vary the net or effective PC resistance seen at two electrical terminals usually located at the top of the bar. This combination of features allows for additional application specific simplification enhancements to aspects such as cost, performance, assembly, potential mounting methods, insertion into the application, and removal from the application.

The present invention provides the following advantages over the prior art:

Sturdy design;

Fewer parts;

Less contamination of components by integral and/or surface additives;

Fewer moving parts;

Low mass;

Low cost;

Simple assembly;

Design flexibility for float assembly shape and size;

Design flexibility for mounting configuration;

Design flexibility for mounting location;

Simple insertion;

Simple removal;

Requires less operation volume within the tank;

Improved resolution;

Decreased hysteresis;

Improved accuracy and stability—due to metallization strips;

Integral temperature compensation capability;

Steel substrate acts as a heat sink thus reducing ignition potential;

Laser trimming for minimum resistance;

Laser trimming for maximum resistance;

Laser trimming for transfer function profile accuracy;

Steel substrate acts as a ground plane for the film resistor for reduced noise attributable to electric and/or magnetic fields; and Steel substrate performs also as a structural member.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 4b is a back view of the printed circuit corresponding to the front view of FIG. 4a;

BEST MODE FOR CARRYING OUT THE INVENTION

Figure 1A:
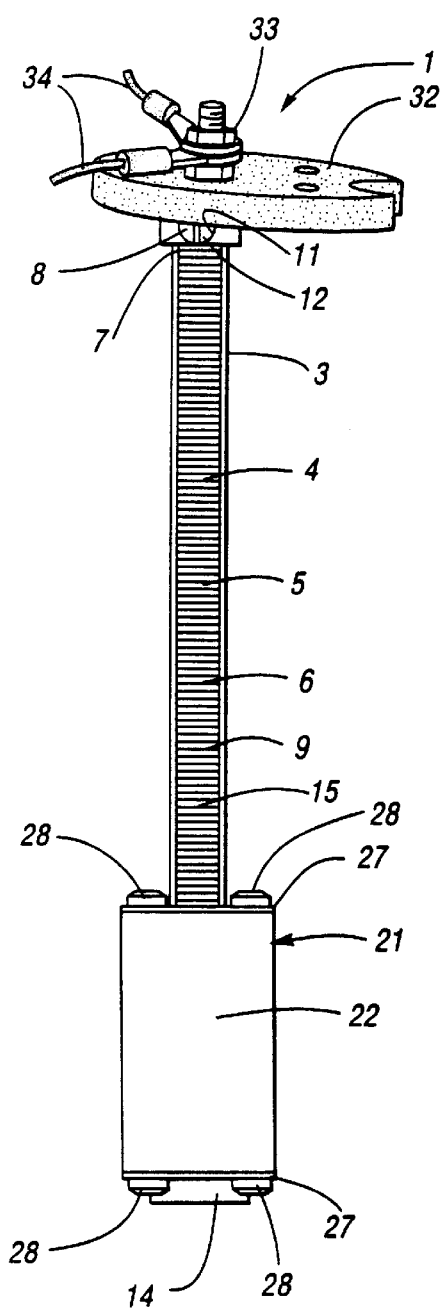
FIGS. 1a and 1b are front and side views, respectively, of a specific version of a non-linear liquid level sensor having a "D-shaped" float housing in a fuel "empty" position and a top mounting bracket incorporating two axis angle corrections (i.e. 7° and 12°) for a motorcycle fuel tank level application of the sensor.
Figure 1B:
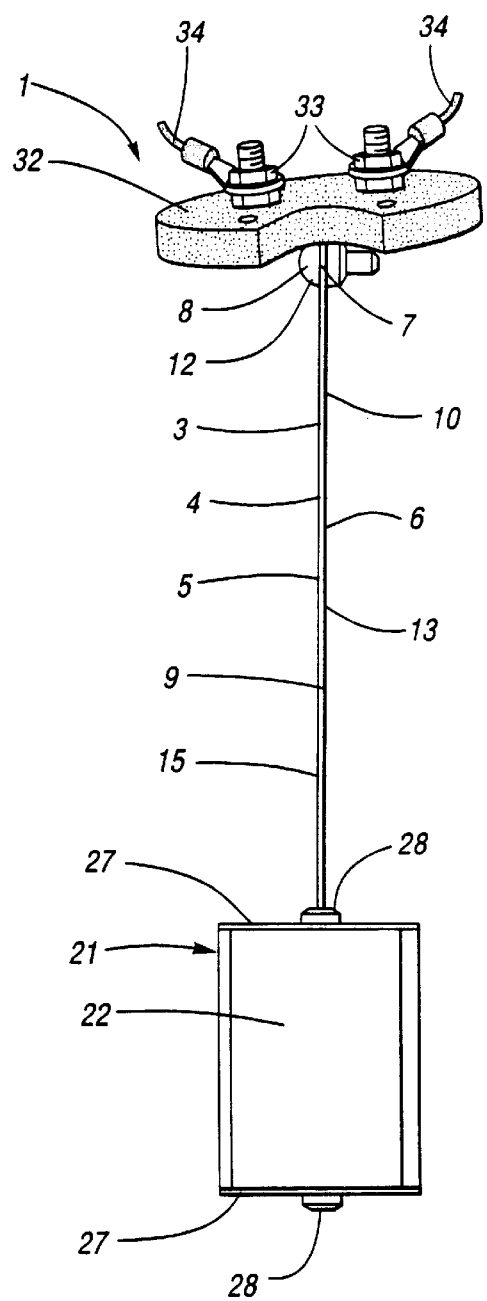
Figure 2:
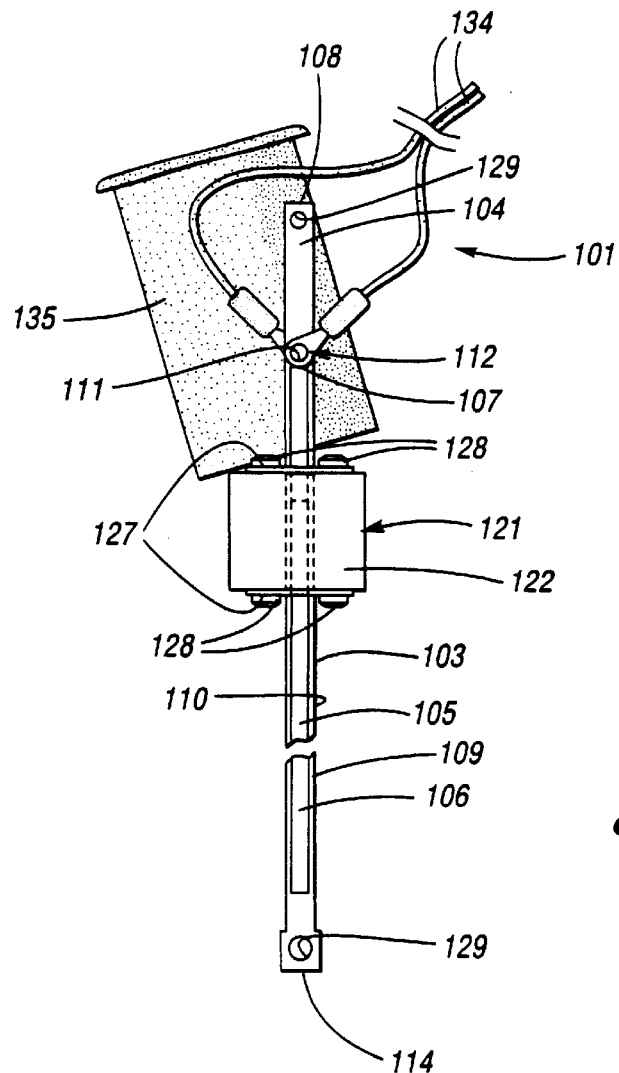
FIG. 2 is a front view of a specific version of a liquid level sensor in its fuel "full" position shown without a mounting bracket for a motorcycle fuel tank level application; electrical terminations are made directly to electrical terminal pads of a printed circuit (i.e., PC)

Referring now to FIGS. 1a, 1b and 2, two embodiments of an analog liquid level sensor, generally indicated at 1 and 101, constructed in accordance with the present invention are illustrated. Both embodiments are described concurrently herein.

The sensors 1 and 101 include support structures in the form of low carbon steel substrate bars 3 and 103, respectively, (each of which has approximate dimensions of 1/16 inch thick×5/16 inch wide×15 inch long), onto which is fired a ceramic dielectric coatings 4 and 104, ELPOR®, respectively, onto which is deposited a thick film resistor patterns 5 and 105, respectively. Palladium metallization patterns 6 and 106 are placed onto both the ceramic coatings 4 and 104, respectively, and the thick film resistor patterns 5 and 105, respectively. The coated bars 3 and 103, with the coatings 4 and 104 and the patterns 5, 6, 105 and 106 formed thereon, are commercially available from Ferro-ECA Electronics Co. The patterns 5, 6, 105 and 106 are collectively referred to as a printed circuit (PC).

The electrical circuits of the sensors 1 and 101 begin and end with the metallization patterns 6 and 106, respectively, as electrical termination pads 7 and 107, respectively, near the tops 8 and 108, respectively, of the bars 3 and 103, respectively. For example, they may be located one and one-half inches from the tops 8 and 108, on both the front faces 9 and 109 and back faces 10 and 110 of the bars 3 and 103, respectively, and proximate through holes 11 and 111 for mounting mechanical terminals 12 and 112, respectively.

On the back faces 10 and 110 the metallization patterns 6 and 106, respectively, are relatively wide rectangular strips (having approximate dimensions of 3/16 inch×13 inch), running nearly to the bottoms 14 and 114 of the bars 3 and 103, respectively. For example, the patterns 6 and 106 run to approximately two-thirds of an inch from the bottoms 14 and 114, respectively.

Figure 5A:
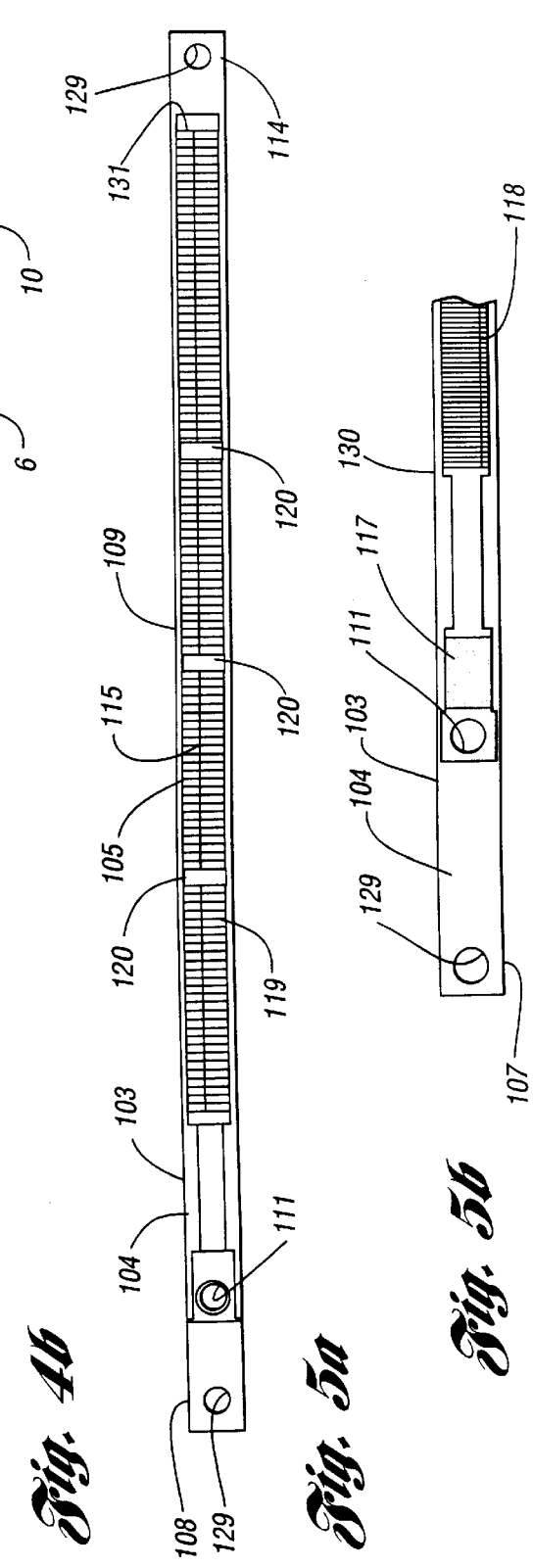
FIG. 5a is a front view of a printed circuit formed on a bar for use with the liquid level sensor shown in FIG. 2.

On the front faces 9 and 109, the metallization patterns 6 and 106, respectively, are laid out in multiple horizontal stripes 15 and 115 (FIG. 5a) (approximate dimensions 1/80 inch×5/32 inch), for purposes of contact with an electrical wiper 16 of an assembly 26 (FIGS. 3a–3c), yet allowing the resistive impedance of the thick film resistor patterns 5 and 105 to dominate as the effective impedance of all of the thick films.

Thick film resistive rectangles 17 and 117, (approximate dimensions of 1/4 inch×3/8 inch), near the termination pads 7 and 107, respectively, allow for laser trimming of the resistance maximum and/or minimum value for the patterns 5 and 105, respectively.

Figure 5B:
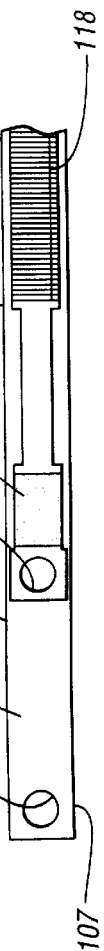
FIG. 5b is an enlarged, broken away view of the printed circuit of FIG. 5a wherein details of the film layout patterns for the resistors and metallizations are illustrated.

Running the length of the multiple metallization pattern stripes 15 and 115 laid out on top of the thick film resistor pattern 5 and 105, respectively, are narrow vertical strips 18 and 118 (FIG. 5b) devoid of the metallization stripes 15 and 115 and separating another group of multiple horizontal stripes 19 and 119, (approximate dimensions 1/80 inch×1/16 inch), respectively, from the similar but longer horizontal stripes 15 and 115 described above.

The narrow vertical strips 18 and 118, which are devoid of metallization, are located to allow direct access for vertical laser trimming of areas of the thick film resistors 5 and 105, respectively, to affect a customized resistance profile versus distance along the bars 3 and 103, respectively. At various spaced increments along the bars 3 and 103, there exist wider and longer horizontal metallization stripes 20 and 120, (approximate dimensions 1/16 inch×1/4 inch), respectively, without the metallization devoid area 18 and 118 as described above. These metallization stripes 20 and 120 delineate the effective resistance of the PC into various zones for the required liquid level sensor 1 and 101 resistance profile transfer function to interface with specific motorcycle fuel gauge calibration points corresponding to indications of E, 1/4, 1/2, 3/4, and F.

In summary, the substrates or coated bars 3 and 103 can be of various shapes and contours, including profiles that are flat, circular, semicircular, square, oval, irregular shaped, and the like. The bars 3 and 103 can be of a dielectric type of non-electrical conducting material or a conductive material. With metallic and/or conductive bars 3 and 103 being used primarily for their mechanical properties, it typically becomes necessary to apply the dielectric insulative coatings 4 and 104, respectively, such as a polymer, glass, or ceramic. Metallic substrates offer stronger mechanical properties with electromagnetic shielding properties and significant improvements in heat sinking capability that provide cooler and safer operation in the event of misapplication of excessive voltage.

Also, in summary, over the coated bars 3 and 103 are placed resistors in series and/or parallel with patterns varied by length, width, thickness, and resistivity. These resistors can be of types such as thin film, thick film, conductive polymer, ceramic, and discrete component. Miniaturization of low profile surface mount resistor components allows discrete component resistors to be viable alternatives for placement on the coated bars 3 and 103. The resistor patterns can be trimmed by such methods as mechanical abrasion and laser ablation.

Electrical contact is made by one or more pairs of metal contacts that move with the float assemblies (as described hereinbelow) on the film resistors and/or metallization patterns (i.e. PCs) deposited on the coated bars 3 and 103. Preferred contact metals exhibit properties including: low chemical reactivity, soft corrosion products, hard for wear durability, and soft for low resistance contact. Such various types include metals such as: noble—chemically nonreactive (gold and platinum), precious—relatively nonreactive and expensive (palladium and silver), metallurgical alloys, tin, antimony, copper, and the like. Electrical terminations to the coated bars 3 and 103 are made by methods such as soldering, welding, and mechanical force from a fastener or crimp. Addition of lubrication materials to the PC is an option discussed below.

Float assemblies, generally indicated at 21 and 121, are designed to freely move up and down the PCs with the liquid level and make electrical contact with the metallization patterns 6 and 106 of both the front faces 9 and 109 and back faces 10 and 110, respectively, to effectively vary the net resistive impedance seen at the two electrical termination pads 7 and 107 formed on the bars 3 and 103, respectively.

The assemblies 21 and 121 include float bodies 22 and 122, respectively, for buoyancy. The bodies 22 and 122 are a chemically stable closed cell sulfur cross-linked material with capability for custom geometry features as thermoset foam known as Nitrophyl™ by Rogers Corporation.

Miniature electrical sliding button contacts 23 make electrical contact with the metallization patterns 6 and 106 on the bars 3 and 103, respectively. Mechanical force of the electrical contacts 23 to the PCs is maintained by mechanical leaf springs 24 and/or coil springs. Although it is possible that these springs 24 are made of electrically nonconductive material, it is usually the practice to use metallic springs such as steel alloy or phosphorus bronze (phos bronze) so that the spring body can also functionally carry the electrical circuit current and thus eliminate the undesirable necessity to add flexible wire to the assemblies 21 and 121.

The metallic springs 24 can be connected to the electrical contacts 23 and associated float assembly hardware by such methods as soldering, brazing, welding, and mechanical fastening.

Figure 3A:
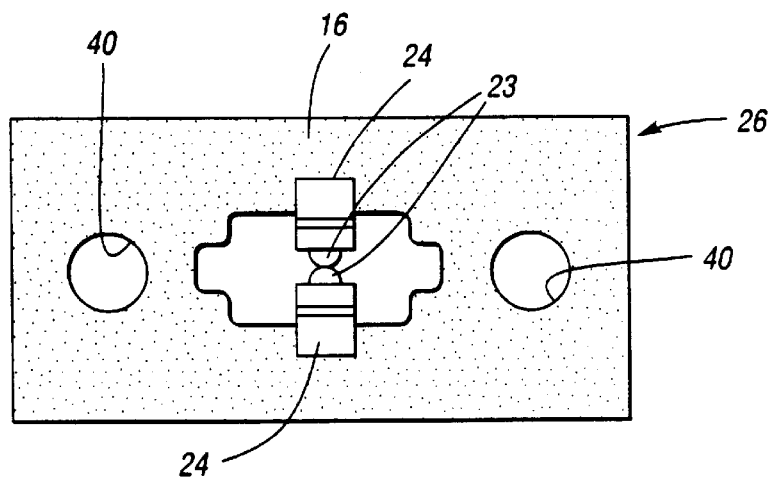
FIGS. 3a, 3b and 3c are top, front and side views, respectively, of a wiper plate terminal assembly and its components which are part of the float assembly of the fuel level sensors of FIGS. 1a and 1b and FIG. 2; the terminal assembly includes a wiper plate preferably made of phosphor bronze and has close clearance tolerances for a very close slip fit with the printed circuit over which it slides, the terminal assembly also preferably includes silver button sliding contacts staked to leaf springs which are preferably resistance welded to the wiper plate.
Figure 3B:
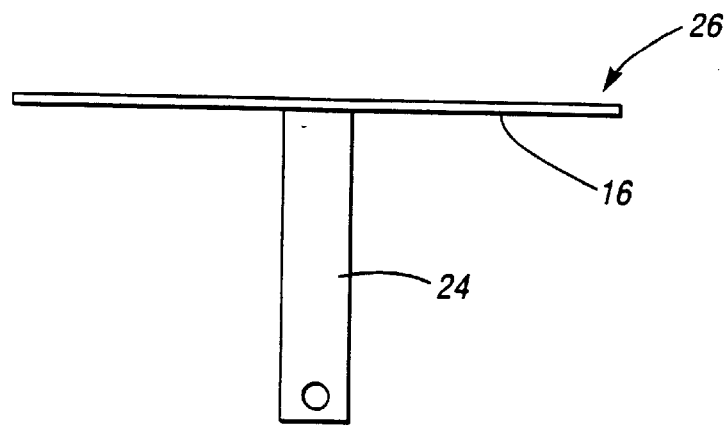
Figure 3C:
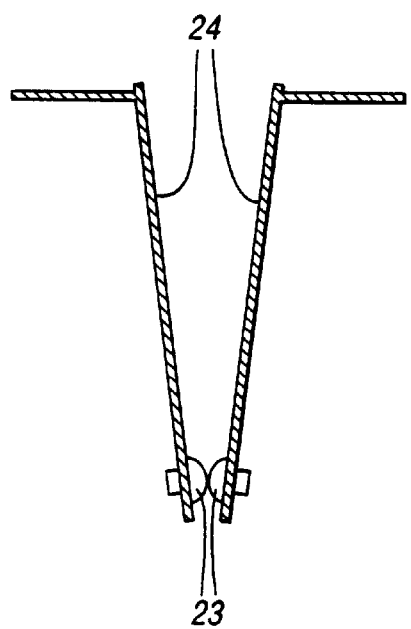
Figure 4A:
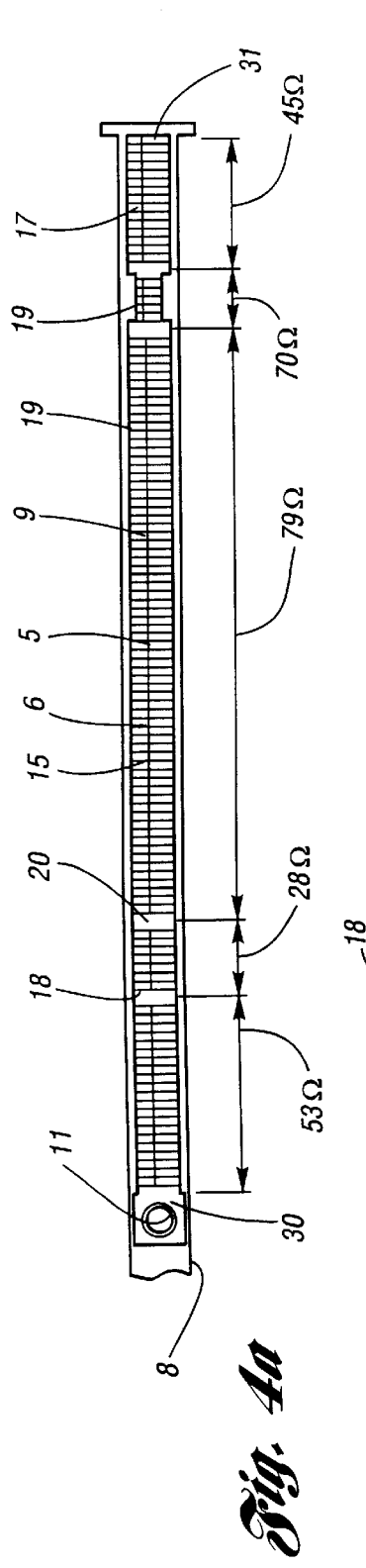
FIG. 4a is a front view of a printed circuit formed on a bar for use with the liquid level sensor shown in FIGS. 1a and 1b wherein various metallization and resistor patterns are illustrated; resistances are specified versus position and between relative positions of the printed circuit.
Figure 4B:
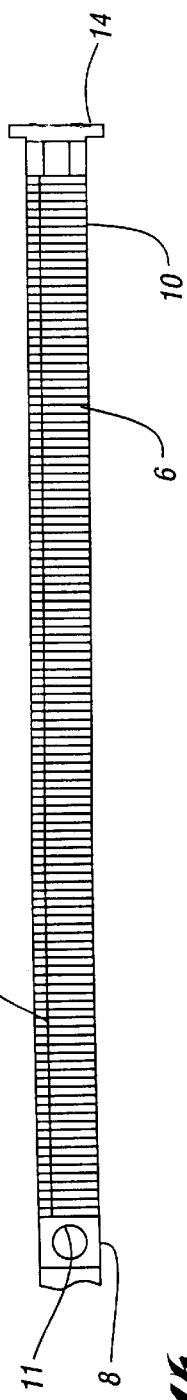

As shown in FIGS. 3a and 3b, a subassembly 26 is formed by resistance welding the leaf springs 24 to the wiper plate 16 having holes 40 for assembly with fasteners 28 and 128 to one or both end caps 27 and 127, respectively. The end caps 27 and 127 are provided on opposite sides of the float bodies 22 and 122, respectively, to provide buoyancy adjustment and a low friction and wear sliding surface with the ceramic coatings 4 and 104, and reduction in mechanical play and thus reduction in wear of the float assemblies 21 and 121 which are lubricated by polyacetal Delrin AF™ from EI DuPont. The fasteners 28 and 128 extend through the holes 40 of the wiper plates 16 and into the float bodies 22 and 122, respectively, to secure the end caps 27 and 127 to the float bodies 22 and 122.

The wiper plates 16 acts as electrical terminals and provides a low friction and low wear sliding surface with the ceramic coatings 4 and 104, and reduction in mechanical play and thus reduction of wear of the float assemblies 21 and 121 on the PCs.

The electrical contacts 23 could be secured on the top end caps 27 and 127 and/or the bottom end caps 27 and 127 of the float assembly through one or more wiper plates 16 for additional contact signal reliability.

In summary, a major component of the float assemblies 21 and 121 are the float bodies 22 and 122, respectively, typically made of one of a diversity of materials such as: thermoset polymers, thermoplastic polymers, glasses, metals such as aluminum or brass, and the like. The float bodies 22 and 122 can be a structural and hollow device and/or a closed cell foam type device of rigid and/or soft material. Density of the float bodies 22 and 122 can be varied to accommodate requirements for buoyancy with various liquids.

A fluid within the float can be of various composition liquid and/or gas for purposes of net buoyance adjustment, floating orientation stability, and chemical compatibility. The float bodies 22 and 122 can take outer shapes including: spherical, cylindrical, right rectangular prism, irregular, and the like. The size and shape of the float bodies 22 and 122 can be configured to fit various tank mount insertion apertures.

The float assemblies 21 and 121 feature a through hole for passage of the coated bars 3 and 103, respectively, such that the through hole will be generally vertical and generally through the center of buoyancy of the float bodies 22 and 122, respectively, as they float in a stable and preferred floating orientation.

Optional material addition of coatings and/or fillers to the coated bars 3 and 103 and/or float bodies 22 and 122, respectively, can be beneficial in various ways.

A very good example of such a material is polytetrafluoroethylene (PTFE), also known as Teflon® by EI DuPont. PTFE is a very high surface energy material with high surface tension and exhibits application beneficial properties resulting in improved long term sensor accuracy and precision by such mechanisms as: non-wetting so it repels liquids and adherence of buoyancy-changing contaminants on the float body; increased float buoyancy by virtue of a lower meniscus of the sensed liquid; lowers friction directly between the float assemblies 21 and 121 and the coated bars 3 and 103, respectively; and reduced friction between the float assemblies 21 and 121 and the coated bars 3 and 103, respectively, by reduction of liquid capillary wetting with its resultant frictional drag. Total volume of the float bodies 22 and 122 is based upon the minimum buoyancy requirement necessary to overcome all anticipated modes of friction and sticking.

The moving electrical contacts 23 (of flat or contoured shape) should be at least coated with metals having suitable properties as discussed previously for good wear, low corrosion, soft corrosion products, and low resistance electrical contact. When cost is not a major concern, it is often preferred to use solid electrical contacts for longer wear life. For reliable operation with a continuous signal of low noise, it is intended that a minimum current greater than 5 mA should pass through each electrical contact to maintain electrical conductivity as driven by voltage, for example five volts, sufficient to start and maintain the current through minor anticipated resistive films on the electrical contacts 23 such that the resultant electrical contact will not suffer from problems called "dry contact". An optional configuration uses rolling electrical contacts along the PCs. Tradeoffs to make for such rolling contacts are increased wear life of both the rolling contacts and the PCs for a reduction of electrical contact conductivity when compared with a typical wiping contact which wipes away contaminants.

In summary, the float assemblies 20 and 120 include various mechanical and functional components including: wear guides, wiper plate terminals, and fasteners. These components all can be sized to alter the net buoyancy of the float assemblies 20 and 120. The wear guides can be of various materials that have low wear and low friction with wear contacting materials of the coated bars 3 and 103. Typical examples of low friction materials are either very hard substances such as metals and ceramics or plastics having intrinsic and/or supplemental lubrication filler(s) such as PTFE and/or oil filled polyacetal and/or nylon.

One example of a very good wear guide material is PTFE, as previously disclosed. Close fitting tolerances of the wear guide material to the coated bars 3 and 103 will maintain the float in a preferred orientation to reduce mechanical friction and reduce mechanical damage potential anticipated from vibration with loose fitting components. The wiper plates 16 can be metallic to be part of the electrical circuit and to enable the leaf springs 24 to be directly connected by welding, brazing, mechanical fastening, or other suitable process. Fastening of float assembly components can be implemented by methods including: bolts, washers, nuts, adhesive, clips, over molding, and the like for maintaining all of the components of the float assemblies 21 and 121 in proper mechanical orientation to achieve all functional purposes.

Rigid mounting of the liquid level sensor 1 and 101 is achieved with a mechanical connection at the top 8 and 108 and/or the bottom 14 and 114 of the coated bars 3 and 103, respectively, including the float assemblies 21 and 121, by mechanical fasteners (not shown) which extend through holes in the coated bars 3 and 103. The hole in the bar 103 is shown at 29. The hole in the bar 3 is not specifically shown.

For added rigidity with single end mounting, at least one low profile "U" mounting bar (not shown) or a similar structural member is attached to the tops 8 and 108 and bottoms 14 and 114 of, and generally parallel with, the coated bars 3 and 103, respectively, such that the resultant frame structure is simple, rigid, and sturdy.

FIG. 2 shows a specific design that is rigidly fixed with a very short "U" bracket (not shown) mechanically attached to both the top 108 and bottom 114 of the coated bar 103 for added rigidity in the specific motorcycle fuel tank application including a filler tube 135.

Referring to FIGS. 1a and 1b, a sealing gasket (not shown) is typically placed between a flange mount 32 and the mating mount location on the tank. Mounting is secured by simple mechanical fasteners such as machine screws (not shown).

The mounting flange with associated flange connectors can be configured to be adaptable to practically any surface location on the container if the coated bar can be held in a substantially vertical orientation. The mounting flange is free to be any practical shape and can include metallic, non-metallic, and composite materials. Metallic flange design usually has some means of dielectric connection to the coated bar to maintain the coated bar at an electrical floating potential, although it is possible that in some applications it might be preferred to have the coated bar at some driven potential or at ground potential. External conductive electrical connections are a practical option for electrical termination. Conductive components then connect to the coated bar via additional electrical terminations that can also provide mechanical connection. Alternatively, the electrical wire terminations such as connectors 33 connected to wire leads 34 (134 in FIG. 2) can simply pass through the flange with or without mounting flange sealing for direct electrical termination to the coated bar.

Seal gaskets are often used between the mounting flange and the fuel tank. Such gaskets are typically made of plastic, elastomer, rubber, metal, composite construction, and the like. An option for applications in which both the tank and the liquid are relatively static is to provide a two-axis pivot mount, as illustrated in FIGS. 1a and 1b, or a ball joint mount that allows the PC board to freely hang vertically thus providing maximum device accuracy attributable to the vertical alignment and the resultant minimal friction forces between the float assembly 21 and the coated bar 3. It is possible that the mounting location flange can be on the side of a tank with the sensing mount configured as either a fixed angle or a swivel. For applications having relatively small ranges of liquid levels with relatively low levels of mechanical motion and/or vibration using only a single end mount is possible. It is possible that the mount can be made from the bottom of a tank, although this has the detrimental possibility of being messy to do maintenance unless the tank is fully empty. The simple up and down motion of the float assembly requires only that the mechanical mount for the coated bar maintain the device in a predominantly vertical orientation.

With respect to FIGS. 1a and 1b, the mount 32 has the external mechanical threaded connectors 33 that electrically feed through with a conductive bracket to make mechanical and electrical connection with the electrical termination pads 7 of the coated bar 3. The vertical scale of fuel level (quarts) is non-linear with vertical position and corresponds to the changing area profile of the motorcycle tank with height. This liquid level sensor 1 is relatively short and rigid so that no bottom support is needed.

The values of the PC resistors can be varied by laser trimming and/or mechanical ablation methods to modify the transfer function of resistance versus float assembly position. Such specifications typically include such characteristics as: maximum resistance, minimum resistance, resistance values and ranges at various locations, and continuous window of resistance range tolerance over the entire float assembly range of motion. Depending upon the interface circuitry, the liquid level sensor transfer function can have various characteristic output function qualities such as: resistance versus position, voltage versus position, ratiometric voltage versus position, and temperature compensation.

Temperature compensation can be implemented via inclusion of series and/or parallel resistors of positive temperature coefficient (PTC) and/or negative temperature coefficient (NTC), and/or engineering to cancel the inherent temperature coefficient (tempco) of the resistance of the PC at one specific point of calibration. Full temperature compensation by the liquid level sensor over the entire liquid level range requires that the compensation resistance also change relative to the position of the float assembly. This can be done by addition of compensation resistors to the PC. Temperature compensation can be implemented by placing appropriate resistors such places as: on the coated bar, at the electrical terminal, within the mounting bracket, within an electrical connector at the mounting bracket, within the wiring (34, 134), or incorporated with an interface circuit (which allows complete compensation although perhaps from a different temperature environment).

The resistor values of the PCs are trimmed to ranges corresponding to positions of the float assemblies 21 and 121. For example, maximum height positions 30 and 130 of the float assemblies 21 and 121, respectively, correspond to a resistance value from 7.0 to 14.0 Ohms and minimum height positions 31 and 131 of the float assemblies 21 and 121, respectively, corresponds to a resistance value from 74.5 to 95.0 Ohms. Resistance values are required at specified locations between are achieved by laser trimming as described above. The resistance profile monotonically decreases with a vertical position increase.

The complete liquid level sensors 1 and 101 are readily inserted straight into a liquid tank mounting orifice by virtue of their sleek design. The cross-sectional area of each of the float assemblies 21 and 121 is round and is the limiting component size factor to consider for insertion of the liquid level sensors 1 and 101 in this application.

Specific material and component choices and configurations are based upon the application specifications. Customer specifications typically cover environmental aspects such as: operating temperature, thermal shock, mechanical impact and/or drop, vibration, application torque, overvoltage operation, high voltage breakdown, relative humidity, high altitude operation, salt spray corrosion, wire pull force, fluid compatibility, life cycles, dither wear, signal impedance, signal transfer function precision, signal transfer function accuracy, allowable signal noise, and signal dropout times. The range of optional component materials and configurations herein discussed is appropriate for engineering design for many applications.

Potential uses of this type of liquid level sensor include, but are not limited to: automobiles, motorcycles, lawnmowers, snowmobiles, all terrain vehicles (ATVs), watercraft, aircraft, power generators, trains, buses, heavy equipment, chemical processes, food processing, refrigeration systems, washing machines, dishwashers, and the like. Potential liquids for which this type of sensor can apply include, but are not limited to: gasoline, gasohol, fuel oil, propane, diesel fuel, ethylene glycol (antifreeze), propylene glycol (antifreeze), glycol and water solutions (antifreeze), methanol water solutions (windshield washer fluid), ammonia and water (cleaning solution), detergent and water solutions, water, refrigerants, hydraulic fluid, beverages, and the like.

While the best mode for carrying out the invention has been described in detail, those familiar with the art to which this invention relates will recognize various alternative designs and embodiments for practicing the invention as defined by the following claims.

What is claimed is:

1. In a system for measuring the level of a liquid in a container having a volume/depth relationship, an analog liquid level sensor comprising:

a support structure adapted to be received and retained within the container;

a pair of electrically spaced terminals;

a printed circuit formed on the support structure and electrically coupled between the terminals and having an effective resistance which varies at different positions on the printed circuit between the terminals wherein the printed circuit includes a resistor pattern and a metallization pattern having metallized graduations formed on opposite sides of the support structure for reduced electrical noise characteristics and improved hysteresis; and a float assembly connected to the support structure to reciprocate in a generally vertical direction relative to the support structure in response to the level of the liquid in the container, the float assembly including a hollow, buoyant housing and a contact assembly supported within the buoyant housing in fixed vertical relationship thereto for making electrical connection with the graduations of the metallization pattern on opposite sides of the support structure for changing the effective resistance of the printed circuit between the terminals, the terminals providing an electrical signal which is a function of the generally vertical position of the contact assembly along the support structure, and wherein the sensor has a resistance-to-float-displacement profile matched to the volume/depth relationship of the container.

2. The sensor as claimed in claim 1 wherein the support structure is a dielectric coated metal bar which acts like a heat sink.

3. The sensor as claimed in claim 2 wherein the resistor pattern is a film resistor pattern and wherein the metal bar acts as a ground plane for the film resistor pattern.

4. The sensor as claimed in claim 1 wherein the resistor pattern includes a temperature compensating resistor.

5. The sensor as claimed in claim 2 wherein the contact assembly includes a pair of spring-loaded contacts for making electrical connection with the graduations of the metallization pattern on opposite sides of the metal bar.

6. The sensor as claimed in claim 1 further comprising a mount coupled to the support structure and adapted to mount the support structure to a surface location on the container so that the support structure is allowed to hang within the container in a generally vertical orientation.

7. In a system for measuring the level of a liquid in a container having a volume/depth relationship, an analog liquid level sensor comprising:

a dielectric coated conductive bar which acts like a heat sink and is adapted to be received and retained within the container;

a pair of electrically spaced terminals;

a resistor pattern and a metallization pattern electrically coupled between the terminals, the metallization pattern having metallized graduations formed on opposites sides of the conductive bar for reduced electrical noise characteristics and improved hysteresis, wherein an effective resistance of the resistor pattern varies at different positions on the conductive bar between the terminals; and a float assembly connected to the conductive bar to reciprocate in a generally vertical direction relative to the conductive bar in response to the level of the liquid in the container, the float assembly including a hollow buoyant housing and a contact assembly including a pair of spring-loaded contacts for making electrical connection with the graduations of the metallization pattern on opposite sides of the conductive bar, the contact assembly being supported within the buoyant housing in fixed vertical relationship thereto for changing the effective resistance of the resistor pattern between the terminals, the terminals providing an electrical signal which is a function of the generally vertical position of the contacts along the conductive bar and wherein the sensor has a resistance-to-float-displacement profile matched to the volume/depth relationship of the container.

8. The sensor as claimed in claim 7 wherein the container is a vehicle fuel tank.

9. The sensor as claimed in claim 7 wherein the resistor pattern is a film resistor pattern.

10. The sensor as claimed in claim 9 wherein the film resistor pattern is a thick film resistor pattern.

11. The sensor as claimed in claim 7 wherein the dielectric coated conductive bar is a ceramic coated metal bar.

12. The sensor as claimed in claim 7 wherein the contacts are sliding contacts.

* * * * *